United States Patent [19]

Clark

[11] 4,036,069
[45] July 19, 1977

[54] MOTORCYCLE CHAIN GUIDE AND TENSIONER

[76] Inventor: Dwaine H. Clark, 8421-23 Rosemead Blvd., Pico Rivera, Calif. 90660

[21] Appl. No.: 676,547

[22] Filed: Apr. 13, 1976

[51] Int. Cl.² .................................................. G01F 3/14
[52] U.S. Cl. ...................... 74/242.1 TA; 74/242.15 B
[58] Field of Search .............. 74/242.1 TA, 242.15 R, 74/242.15 B

[56] References Cited

U.S. PATENT DOCUMENTS

| 3,665,780 | 5/1972 | Lunenschloss | 74/242.1 TA X |
| 3,828,620 | 8/1974 | Heathwaite et al. | 74/242.15 B |

*Primary Examiner*—Leonard H. Gerin
*Attorney, Agent, or Firm*—Clarence A. O'Brien; Harvey B. Jacobson

[57] ABSTRACT

A mounting plate is provided for removable rigid support from and in overlapped engagement with the lower marginal portion of a mount flange carried by the rear swing arm of a motorcycle adjacent to which the motorcycle chain is trained. A pivot shaft has one end portion removably rigidly secured through the plate and one pair of corresponding ends of parallel arms are mounted on the pivot shaft for oscillation relative thereto. A roller is journaled between the other pair of corresponding ends of the parallel arms and spring structure is operatively connected between one of the arms and the mounting plate for yieldingly biasing the arms in one direction of angular displacement about the pivot shaft, the chain of the associated motorcycle being receivable between the end portions of the arms between which the roller is journaled and with the chain passing over the roller.

10 Claims, 4 Drawing Figures

MOTORCYCLE CHAIN GUIDE AND TENSIONER

BACKGROUND OF THE INVENTION

Various forms of chain tensioning devices have been heretofore designed for use in conjunction with motorcycle chains as well as drive chains found in other environments. When a chain tensioner is used on a motorcycle equipped with swing arm suspension for the rear wheel of the motorcycle, it is imperative that the chain tightener be located closely forward of the lower forward quadrant of the driven sprocket carried by the rear wheel of the motorcycle. In this manner, minimum shifting of the chain relative to the mounting portion on the adjacent swing arm for the chain tightener in response to oscillation of the swing arm is experienced and the chain tightener may more readily effect more even tension on the chain even when the motorcycle is traveling at high speeds over rough terrain.

While many of the previously designed chain tensioners are operative to perform the desired chain tensioning operation under other than severe conditions, most previously provided chain tensioners do not perform well under adverse conditions.

Examples of various forms of previously patented chain tensioners are disclosed in U.S. Pat. Nos. 3,136,170, 3,198,025, 3,673,884, 3,834,246, 3,834,477 and 3,838,606.

BRIEF DESCRIPTION OF THE INVENTION

The tensioner of the instant invention includes an upstanding mounting plate including a generally horizontal upper marginal edge portion adapted for rigid support from the lower marginal edge of a depending mount flange extending along and supported from an associated motorcycle swing arm. The lower marginal portion of the plate has one end of an elongated pivot shaft removably rigidly secured therethrough and the other end portion of the pivot shaft has one pair of corresponding ends of a pair of arms mounted thereon for angular oscillation about the pivot shaft. A roller is journaled between the other pair of corresponding ends of the arms and the spacing between the arms is such to receive a motorcycle chain therebetween with the chain passing over the roller. Spring structure is provided and connected between one of the arms and the mounting plate whereby the arms are yieldingly biased to swing in one direction about the pivot shaft.

The main object of this invention is to provide a chain tensioner for a motorcycle constructed in a manner whereby the desired tensioning forces on the associated chain may be maintained substantially constant even though the motorcycle is equipped with swing arm suspension for the rear wheel thereof and is traveling at high speeds over rough terrain.

Another object of this invention is to provide a chain tensioner of such a construction so as to be readily adaptable to mounting on various different types of motorcycles.

A still further object of this invention is to provide a chain tightener in accordance with the preceding objects and constructed in a manner whereby the tensioner may also function as a guide for the associated motorcyle chain after an initial break-in period of use of the tensioner.

A final object of this invention to be specifically enumerated herein is to provide a motorcycle chain tensioner in accordance with the preceding objects and which will conform to conventional forms of manufacture, be of simple construction and easy to mount so as to provide a device that will be economically feasible, long lasting and relatively trouble free in installation.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE INVENTION

Figure 1:
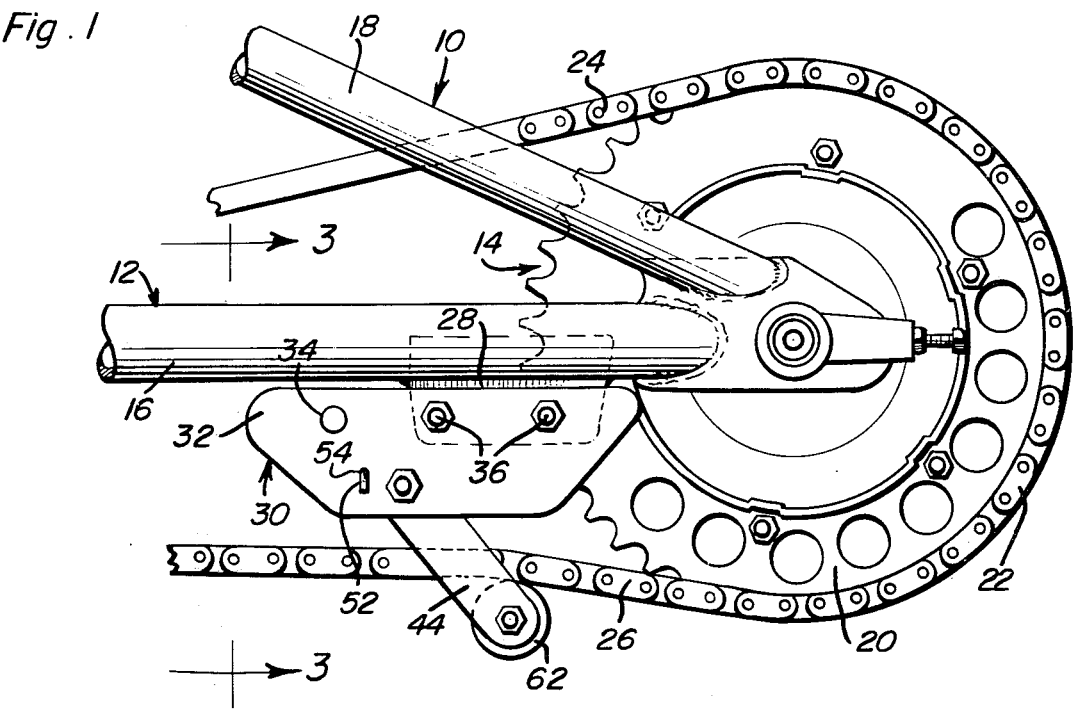
FIG. 1 is a fragmentary side elevational view of the swing arm suspension of a conventional form of motorcycle and the associated rear driven sprocket of the chain drive of the motorcycle with the tensioner of the instant invention supported from the swing arm suspension and operatively engaged with the drive chain.
Figure 2:
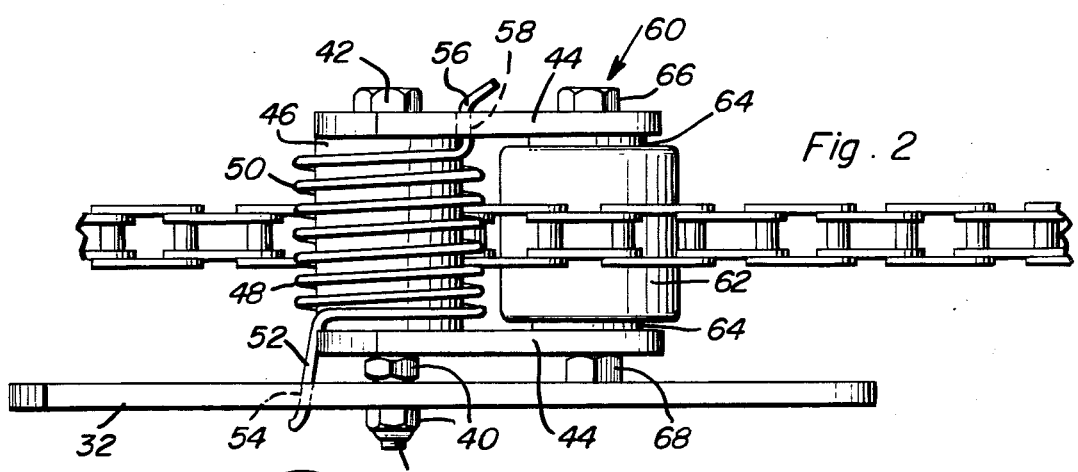
FIG. 2 is an enlarged fragmentary top plan view of the assemblage illustrated in FIG. 1, but with the swing arm suspension and rear driven sprocket of the motorcycle removed.
Figure 3:
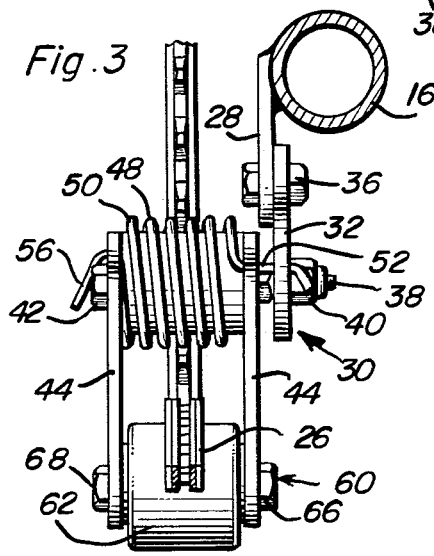
FIG. 3 is an enlarged fragmentary transverse vertical sectional view taken substantially upon the plane indicated by the section line 3—3 of FIG. 1.
Figure 4:
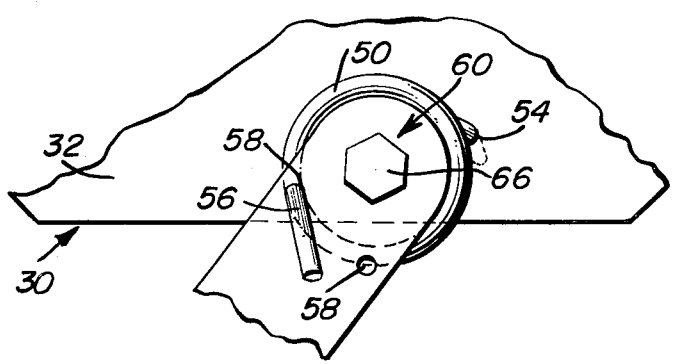
FIG. 4 is a fragmentary enlarged elevational view of the chain tensioner as seen from the rear side of FIG. 1.

Referring now more specifically to the drawings, the numeral 10 generally designates a conventional form of motorcycle including a swing arm referred in general by the reference numeral 12 from which a rear wheel assembly referred to in general by the reference numeral 14 is supported. The swing arm 12 includes a lower horizontal member 16 and an upper rearwardly and downwardly inclined member 18 joined at its lower rear end to the rear end of the member 16. The wheel assembly 14 includes a driven sprocket 20 about which the rear end of the drive chain 22 of the motorcycle 10 is trained.

The upper reach 24 of the chain 22 is normally under tension under drive conditions and the lower reach 26 of the chain 22 is normally slack under drive conditions.

The member 16 has a mount flange 28 supported therefrom and the flange 28 depends downwardly below the lower periphery of the member 16. The flange 28 is a conventional part of the motorcycle 10 as are all of the other aforementioned components.

The chain tensioner of the instant invention is referred to in general by the reference numeral 30 and comprises a horizontally elongated upstanding mounting plate 32 whose upper marginal portion is generally horizontal and includes a plurality of longitudinally spaced mounting apertures 34 formed therein. A pair of fasteners 36 are utilized to removably rigidly attach the plate 32 to the flange 28 in overlying relation relative to the outer side of the lower marginal portion of the flange 28. The fasteners 36 secured through one pair of the openings or apertures 34 and the flange 28.

A forward lower marginal portion of the plate 32 has one end portion of an elongated pivot shaft 38 secured therethrough. The end portion of the pivot shaft 38 secured through the plate 32 is threaded and a pair of nuts 40 are threaddedly engaged with the pivot shaft 38 on opposite sides of the plate 32 and turned tightly against the latter. The end of the pivot shaft 38 remote from the plate 32 is provided with an enlarged head 42 and one pair of corresponding ends of a pair of elongated plate-like arms 44 are mounted on the pivot shaft 38 between the head 42 and the adjacent nut 40 for pivotal movement about the pivot shaft 38. A large diameter sleeve-type spacer 46 is disposed about the pivot shaft 38 between the arms 44 and the central body portion 48 of a coiled torsion spring 50 is closely, but loosely, disposed about the spacer 46. One end of the torsion spring 50 is angulated as at 52 and passes through a small diameter bore 54 formed in the plate 32 and the other end of the torsion spring 50 is also angulated as at 56 and passes through one of a pair of small diameter bores 58 formed through the arm 44 remote from the plate 32. The bores or apertures 58 are spaced equally from the pivot shaft 38 and are relatively angularly displaced thereabout. An axle assembly referred to in general by the reference numeral 60 extends and is secured between the ends of the arms 44 remote from the pivot shaft 38. A large diameter roller 62 is journaled on the axle assembly 60 intermediate the arms 44 and a pair of washers 64 are disposed on the axle assembly 60 between the ends of the roller 62 and the confronting sides of the adjacent arms 44. The axle assembly 60 comprises a threaded bolt having a head 66 at one end and a threaded nut 68 threadedly secured on its other end. The outer nut 40 and the nut 68 are of the self-locking type whereby they will not loosen under vibration and the inner nut 40 functions as a jamb nut.

The torsion spring 50 yieldingly biases the arms 44 in a counterclockwise direction as viewed in FIG. 1 whereby the roller 62 is urged upwardly against the underside of the lower reach 26 of the chain 22 so as to upwardly deflect the lower reach 26 and tension the latter. The lower reach 26 is received between the arms 44 and over the roller 62. The roller 62 may be constructed of nylon or a similar entire friction material and it is appreciated that rapid movement of the lower reach 26 of the chain 22 over the roller 62 will cause the chain to wear a shallow groove about the periphery of the roller 62. Thus, after initial use of the tensioner 30, the roller 62 not only functions to tension the lower reach 26 of the chain 22 but also as a guide for the lower reach 26 against lateral deflection thereof in a horizontal direction.

The torsion spring 50 is closely, but loosely, disposed about the spacer 46 and tightens about the spacer 46 when the arms 44 are swung in clockwise directions as viewed in FIG. 1 in order to limit clockwise swinging of the arms 44. Also, by providing at least a pair of apertures 58, the preset tension of the torsion spring 50 when the roller 62 is in a chain tensioning position such as that illustrated in FIG. 1 of the drawings may be adjusted.

The foregoing is considered as illustrative only of the principles of the invention. Further, since numerous modifications and changes will readily occur to those skilled in the art, it is not desired to limit the invention to the exact construction and operation shown and described and accordingly all suitable modifications and equivalents may be resorted to, falling within the scope of the invention.

What is claimed as new is as follows:

1. A chain tensioner and guide assembly for a motorcycle and in particular for a motorcycle of the type including swing arm suspension for the rear wheel of the motorcycle, said assembly including a single upstanding mounting plate having a generally horizontal upper marginal edge portion, said upper marginal portion including means adapting said plate for rigid support from a depending mount flange extending along an associated swing arm with upper marginal portion lapped over at least the lower marginal portion of said mount flange, an elongated pivot shaft having one end portion thereof removably rigidly secured through said plate with the other end portion of said pivot shaft projecting laterally outwardly of said plate, a pair of parallel arms having a first pair of corresponding ends mounted on said other end portion of said pivot shaft at points spaced therealong, said plate including a lower marginal edge portion, the other pair of corresponding ends of said arms projecting downwardly below said lower marginal edge portion and having axle means extending and connected therebetween, a roller journaled on said axil means between said other pair of arm ends and spring means operatively connected between said plate and one of said arms for yieldingly biasing said arms in one direction of angular displacement about said pivot shaft relative to said plate.

2. The conbination of claim 1 wherein said spring means is operatively connected between said plate and the arm remote from said plate.

3. The combination of claim 1 including a sleeve-type spacer disposed on said pivot shaft between said one pair of corresponding ends of said arms.

4. The combination of claim 3 wherein said spring means comprises a coiled torsion spring disposed about said spacer and having one end anchored relative to said plate and the other end anchored relative to the arm remote from said plate.

5. The combination of claim 4 wherein said coiled torsion spring is loosely but closely disposed about said spacer whereby swinging of said arms in the other direction about said pivot shaft less than one revolution will cause said spring to contract tightly about said spacer to limit the swinging of said arms in said other direction about said pivot shaft.

6. The combination of claim 1 including a sleeve-type spacer on said axle means between said other part of corresponding ends of said arms.

7. The combination of claim 1 wherein one end of said axle means is secured through the arm adjacent said plate and includes a terminal end projecting outwardly of that arm a distance sufficient to abut said plate to limit swinging of said arms in said one direction about said pivot shaft.

8. the combination of claim 7 including a sleeve-type spacer disposed on said pivot shaft between said one pair of corresponding ends of said arms, wherein said spring means comprises a coiled torsion spring disposed about said spacer and having one end anchored relative to said plate and the other end anchored relative to the arm remote from said plate, wherein said coiled torsion spring is loosely but closely disposed about said spacer whereby swinging of said arms in the other direction about said pivot shaft less than one revolution will cause said spring to contract tightly about said spacer to limit the swinging of said arms in said other direction about said pivot shaft.

9. The combination of claim 8 including a sleeve- type spacer on said axle means between said other pair of corresponding ends of said arms.

10. In combination with a motorcycle of the type including a rear swing arm from which a rear wheel is journaled including a driven sprocket wheel over which the rear loop end of a drive chain is trained, the drive chain including upper and lower generally horizontal reaches, a chain tightener comprising a rearwardly and downwardly inclined arm assembly pivotably supported at its upper forward end from said swing arm for oscillation about a horizontal transverse axis, a horizontal roller journaled from the lower rear end of said arm assmebly for rotation about a horizontal axis paralleling the first mentioned axis, spring means connected between said arm assembly and said swing arm yieldingly biasing said arm assembly in a direction to swing the rear lower end thereof upwardly, said lower reach of said chain passing over and being deflected upwardly by said roller, the contact of said roller with said chain being disposed closely forward of the lower forward quadrant of said driven sprocket.

* * * * *